(12) United States Patent
Hlade et al.

(10) Patent No.: US 6,176,558 B1
(45) Date of Patent: Jan. 23, 2001

(54) CASSETTE DISPLAY UNIT

(75) Inventors: Gregg J. Hlade, Glenview; William Klippert, Jr., Mt. Prospect, both of IL (US)

(73) Assignee: Schutz International Inc., Morton Grove, IL (US)

(*) Notice: Under 35 U.S.C. 154(b), the term of this patent shall be extended for 0 days.

(21) Appl. No.: 09/349,584

(22) Filed: Jul. 9, 1999

(51) Int. Cl.⁷ ...................................................... A47F 3/024
(52) U.S. Cl. ............................... 312/42; 221/155; 221/92; 312/9.52; 312/321.5
(58) Field of Search ........................... 312/9.1, 9.9, 9.42, 312/9.43, 9.44, 9.53, 9.54, 9.55, 42, 117, 124, 216, 217, 218, 219, 211, 321.5; 221/130, 131, 123, 191, 197, 155, 281, 92

(56) References Cited

U.S. PATENT DOCUMENTS

| 806,719 | * | 12/1905 | Winchel | 312/124 X |
| 849,590 | * | 4/1907 | Bailey | 312/124 X |
| 3,697,148 | * | 10/1972 | Weber | 312/321.5 |
| 4,007,853 | * | 2/1977 | Bahneman | 312/117 X |
| 4,037,756 | * | 7/1977 | Jaquish | 312/42 X |
| 4,682,826 | * | 7/1987 | Mestdagh | 312/42 |
| 5,269,597 | * | 12/1993 | Yenglin et al. | 312/42 |
| 5,624,042 | * | 4/1997 | Flum et al. | 312/42 X |
| 5,794,817 | * | 8/1998 | Rosa | 312/42 X |

* cited by examiner

Primary Examiner—Anthony D. Barfield
Assistant Examiner—Michael J. Fisher
(74) Attorney, Agent, or Firm—Wood, Phillips, VanSanten, Clark & Mortimer (57) ABSTRACT

A display system having a frame, a storage space on the frame for an object to be displayed, a closure element on the frame that is repositionable between a closed position and an open position, a loading opening through at least one of the frame and closure element in communication with the storage space, and a removal opening through at least one of the frame and closure element that is spaced from the loading opening and in communication with the storage space. The closure element blocks access to the storage space from a loading location with the closure element in the closed position and permits access to the storage space from the loading location with the closure element in the open position. An object to be display can be directed into the storage space selectively a) from the loading location with the closure element in the open position and b) through the loading opening with the closure element in the closed position into a storage position within the storage space and removed from the storage position through the removal opening.

26 Claims, 11 Drawing Sheets

CASSETTE DISPLAY UNIT

BACKGROUND OF THE INVENTION

1. Field of the Invention

This invention relates to displays and, more particularly, to a display in which discrete objects can be exhibited, and from which the objects can be controllably removed.

2. Background Art

The sale of audio and video tapes and disks has branched out from dedicated movie, music and computer stores to virtually every conceivable point of purchase sales environment. Movies and music in both tape and disk form are now commonly sold in gas stations, convenience stores, grocery stores, and the like. It is also common to see these tapes and disks sold in fast food environments during periodic promotions which are coordinated with the release of high profile movies or plays.

To best exploit this market, it is desirable to place the tapes and disks on display for purchase or rental in a highly visible and heavily trafficked area of a store. Ideally, the tapes and disks should be displayed so that the containers therefor are readily viewable by a prospective purchaser or renter. At the same time, the actual tape or disk that is to be purchased or rented should be readily accessible to be picked up by the customer.

Accessibility to the tape or disk is particularly a problem where space is at a premium. In dedicated movie rental facilities, video containers may be lined edge-to-edge over a large expanse of a vertical wall. It is not uncommon for as much as an 8'×8' area of a wall to be occupied by copies of a single, popular title.

While dedicated movie rental and sales facilities may have the luxury of space, in other types of business, only a small area may be available for display of such items. A purveyor of such items may be left with the options of either purchasing and displaying only a limited number of a particular title or storing a separate supply thereof at a location remote from the display. The former option is undesirable in that potentially a large number of sales or rentals may be lost. This problem is aggravated by the fact that a particular operation may get a reputation for having very limited product availability, which may result in a loss of customers that might frequent the facility for tape or disk movie or rental.

The other option is undesirable in that it is an inconvenience to both the customer and the store operator. In the event that a supply of a particular title is exhausted at the display, the customer may have to have a sales representative intervene and seek out a tape or movie at the remote location. This may significantly compromise the overall efficiency of the store.

If the above two options are not practical, the store operator may revert to the mass display, as discussed above. As an alternative to an edge-to-edge display as is common in dedicated movie rental facilities, the individual packages may be stacked one against the other. However, to the knowledge of the inventors herein, no such display arrangement is in existence which allows the tapes and/or disks to be stored in bulk at the point of purchase in such a manner that the identity of the tape or disk can be prominently advertised and so that the tape and/or disk are conveniently situated to be removed one-by-one for purchase or rental.

Another problem with this bulk display is that undetected removal of the tape or disk may occur. This is particularly a problem with smaller size objects such as digital video disks which, while small, are expensive. A thief could grasp a handful of the bulk display disks and place them in a coat pocket and depart the premises without detection.

Attempted theft of the above tapes and disks encountered in dedicated tape and disk rental operations may be detected by using electronic sensors at the entrance and exit doors of the facilities. However, in operations where sales of tapes and disks is merely an adjunct to the main business, investment in such detection equipment may not be warranted. Since the tapes and disks may be relatively high priced and relatively low profit margin items, the potential purveyor of such items may opt against offering this type of product because of the potential loss that is attributable to theft. The store operator that makes this decision may not only lose the revenue associated with the tapes and movies, but the additional revenue from the main business sales which occur as an incident of people coming in to peruse available disks and tapes.

The theft problem is aggravated by the fact that many facilities, such as grocery stores, may make available tapes and disks only for certain hours, before and/or after which the main business remains open. The tape and disk area may be unattended by any employee while the other business in the facility is ongoing. This increases the likelihood of theft. Employee theft may also be problem. Employees working in the facility after hours may be tempted to take readily accessible tapes and/or disks.

A further problem with displaying and dispensing tapes and disks from facilities not dedicated to these products is that sometimes expensive and elaborate displays might be required for the tapes and disks. Generally, to produce such a display with any significant capacity, a permanent-type display unit might be required. Aside from the expense involved in constructing such a permanent-type display, flexibility in rearranging display areas may be lost.

The above are just some of the many things that are often considered in displaying tapes and disks for sale or rental. Even though tapes and disks offer a tremendous lure to customers and to virtually any facility, business owners may opt against these displays due to the potential expense, theft problems, etc. As a result, a substantial business opportunity may be lost.

SUMMARY OF THE INVENTION

The invention contemplates a display system having a frame, a storage space on the frame for an object to be displayed, a closure element on the frame that is repositionable between a closed position and an open position, a loading opening through at least one of the frame and closure element in communication with the storage space, and a removal opening through at least one of the frame and closure element that is spaced from the loading opening and in communication with the storage space. The closure element blocks access to the storage space from a loading location with the closure element in the closed position and permits access to the storage space from the loading location with the closure element in the open position. An object to be display can be directed into the storage space selectively a) from the loading location with the closure element in the open position and b) through the loading opening with the closure element in the closed position into a storage position within the storage space and removed from the storage position through the removal opening.

The display system may further include at least one object that is at least one of a) an audio tape, b) a video tape, c) an audio disk, d) a video disk, and e) a disk with data stored thereon that is in the storage position in the storage space. A plurality of the objects may be in vertically stacked relationship in the storage position in the storage space.

In one form, the loading opening is above the removal opening so that objects directed into the storage space through the loading opening are urged under their own weight downwardly towards the removal opening.

A door may be provided and is repositionable between a blocking position and an access position. The door in the blocking position prevents removal of an object from the storage space through the removal opening.

A locking system may be provided on the frame for selectively maintaining the door in the blocking position. In one form, the locking system includes a bar that is pivotable about a substantially vertically extending axis relative to the frame between locked and unlocked positions. The bar in the locked position abuts to the door to prevent the door from moving from the blocking position into the access position.

In one form, the closure element defines a receptacle for an object to be displayed, with there being a window on the closure element to allow viewing of an object in the receptacle on the closure element with the closure element in the closed position.

In one form, a second loading opening communicates with the receptacle on the closure element and a door is provided on the closure element that is repositionable between a) a blocking position wherein the door prevents the direction of an object to be displayed through the second loading opening into the receptacle on the closure element and b) an access position wherein the object to be displayed can be directed through the second loading opening into the receptacle on the closure element.

The display system may further include a divider that is positionable selectively in a plurality of different positions within the storage space to thereby define different compartment configurations within the storage space.

A cam surface may be provided within the storage space for guiding an object directed into the storage space through the loading opening in a direction transverse to vertical as an object moves under its own weight towards the removal opening.

The display system may further include a cassette within the storage space and defining a receptacle for an object to be displayed, with there being an exit opening on the cassette in communication with the receptacle. The removal opening has a first area, with the exit opening having a second area, with the first and second areas being different. The second area may be smaller than the first area.

A plurality of objects may be provided within the cassette receptacle.

At least one rolling element may be provided on the frame for facilitating movement of the frame against, and relative to, a subjacent surface supporting the display system.

In one form, there are a plurality of storage sub-spaces in the storage space on the frame and a plurality of closure elements on the frame that are each associated with a storage sub-space and repositionable selectively between a) a closed position wherein each closure element blocks access to its associated storage sub-space from an associated loading location and b) an open position wherein access to the storage sub-space associated with each closure element is permitted from the associated loading location.

In one form, a first closure element in the plurality of closure elements is spaced vertically from a second closure element in the plurality of closure elements.

In one form, the frame has first and second transverse walls and a first closure element in the plurality of closure elements is provided on the first wall and a second closure element in the plurality of closure elements is provided on the second wall.

A storage compartment may be provided on the frame and separated from the storage space for storing a supply of objects to be placed in the storage space.

A lockable door may be provided to selectively prevent access to the storage compartment.

The invention is also directed to a display system having a frame, a storage space on the frame, at least one object that is at least one of a) an audio tape, b) a video tape, c) an audio disk, d) a video disk, and e) a disk with data stored thereon in a storage position in the storage space, a loading opening in communication with the storage space through which the at least one object can be directed into the storage space, and a removal opening in communication with the storage space and through which the at least one object can be removed from the storage space.

The display system may include a second loading opening and a closure element on the frame that is repositionable selectively between an open position and a closed position. The closure element in the closed position substantially blocks the second loading opening to prevent direction of the at least one object through the second loading opening into the storage space. The closure element in the open position permits the at least one object to be directed through the second loading opening into the storage space.

DETAILED DESCRIPTION OF THE DRAWINGS

A display system, according to the present invention, is shown in the drawings at 10. The display system 10 consists of a frame 12 which defines a storage space 14 for objects 16 to be displayed. In the embodiment shown, the frame 12 has four walls, with two transverse walls 18, 20 shown. Through an arrangement of internal partitions, the storage space 14 is divided into four, vertically spaced sub-spaces 22 on each wall 18, 20. The precise number of sub-spaces 22 is, a matter of design choice. The remaining walls have a like arrangement of storage sub-spaces 22. Alternatively, the frame 12 can be constructed for corner placement such that the other walls do not have any storage spaces 22 defined therewithin. In another form, storage sub-spaces 22 may be provided on only the front wall 18.

The display system 10 is designed to accommodate a wide range of objects 16 and is particularly suitable for the storage and display of objects 16 such as conventional audio tapes, video tapes, audio disks, video disks, disks with data stored thereon, etc. The display system 10, as described in greater detail below, is designed so that the objects 16 can be conveniently loaded into the storage sub-spaces 22, prominently displayed so that a prospective customer can identify, from externally of the storage sub-spaces 22, the objects 16 within the storage sub-spaces 22, and removed from the storage sub-spaces 22 one-by-one for purchase or rental. At the same time, a locking system at 24 is incorporated and is selectively operable to prevent unauthorized removal of the objects 16 from the storage sub-space 22 with the locking system 24 in a locked state.

As seen particularly in FIGS. 3–6 and 13, each storage sub-space 22 has an associated loading opening 26 which allows bulk loading of objects 16 from a loading location, in front of the opening 26, through the opening 26, and into a storage position in the storage sub-space 22. A closure element 28 is associated with each storage sub-space 22 and is movable selectively between a closed position, as shown in each of FIGS. 1, 2, 4, 5, 14 and 15, and an open position, as shown for the lower closure element 28 in FIG. 3 and in FIGS. 6, 13 and 16.

Figure 19:
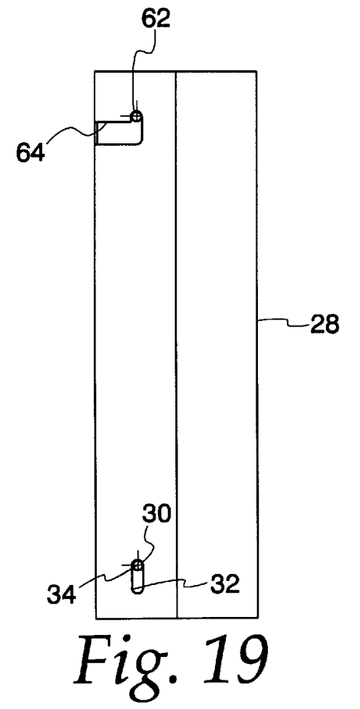
FIG. 19 is an enlarged, side elevation view of the closure element in the closed position therefor.

Pins 30 (see FIGS. 19–21) project from the frame 12 into elongate slots 32 adjacent the bottom of each closure element 28 to guide pivoting movement of each closure element 28 around a horizontally extending axis 34 between the open and closed positions.

In the open position for each closure element 28, the closure element 28 cooperates with the frame 12 in such a manner that a planar surface 38 on the closure element 28 is oriented substantially horizontally (See FIGS. 6, 13 and 16), whereby it is itself strategically situated to have objects 16 directed therewithin for display, as hereafter described, and so as to be conveniently grasped for resituation to the closed position. With the closure element 28 so situated, objects 16 can be conveniently directed through the loading opening 26 into a stacked relationship within the associated storage sub-space 22.

Figure 13:
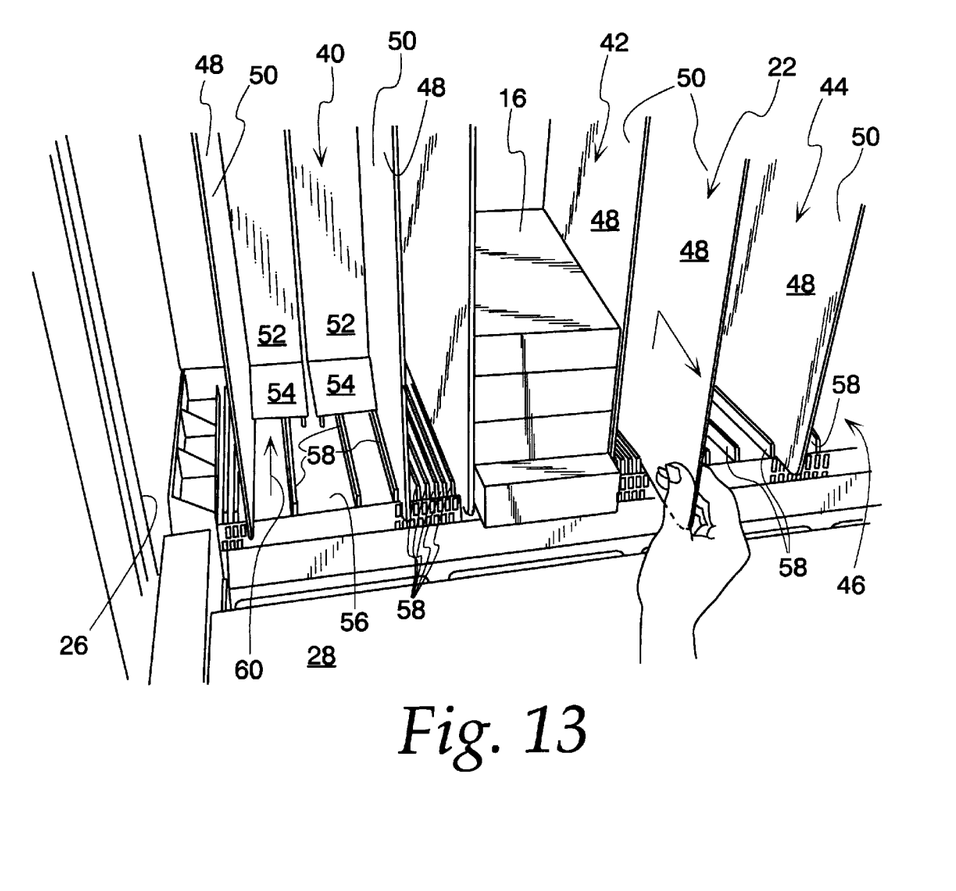
FIG. 13 is an enlarged, fragmentary, perspective view of the storage space with the closure element in an open position and one of the dividers being positioned within the storage space.

In this embodiment, each storage sub-space 22 is divided into four compartments 40, 42, 44, 46, as shown in FIG. 13. This is accomplished by using a series of removable dividers 48, as shown in FIGS. 4–6 and 9–13. Each divider 48 has a flat main body 50 with a transverse rear wall 52 which defines an angled ramp surface 54. As seen in FIGS. 4–6 and 13, the storage sub-space 22 is bounded by a bottom wall 56 with upwardly projecting, and parallel, rails 58 which facilitate guided introduction of the dividers 48 in the direction of the arrow 60 within the storage sub-space 22. Between adjacent rails 58, receptacles are defined for the dividers 48. By placing the dividers 48 between different adjacent rails 58, the configuration of the compartments 40, 42, 44, 46 can be varied. In this particular construction, four compartments 40, 42, 44, 46 are formed with substantially equal width. However, the number and width of the compartments 40, 42, 44, 46 may be varied depending upon the number of objects 16 being displayed, the amount of storage space required, and the size and shape of the objects 16.

Figure 20:
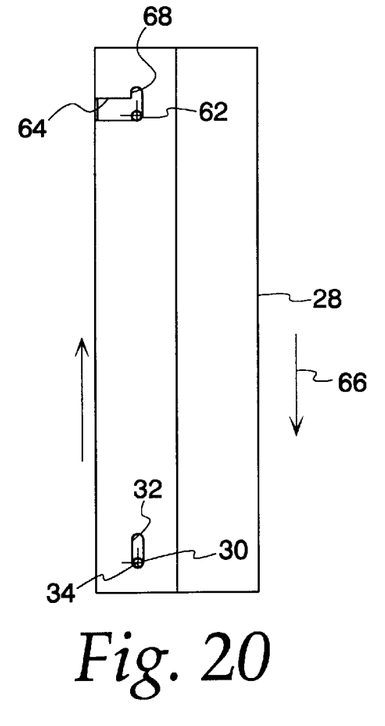
FIG. 20 is a view as in FIG. 19 with the closure element being moved towards the open position therefor.
Figure 21:
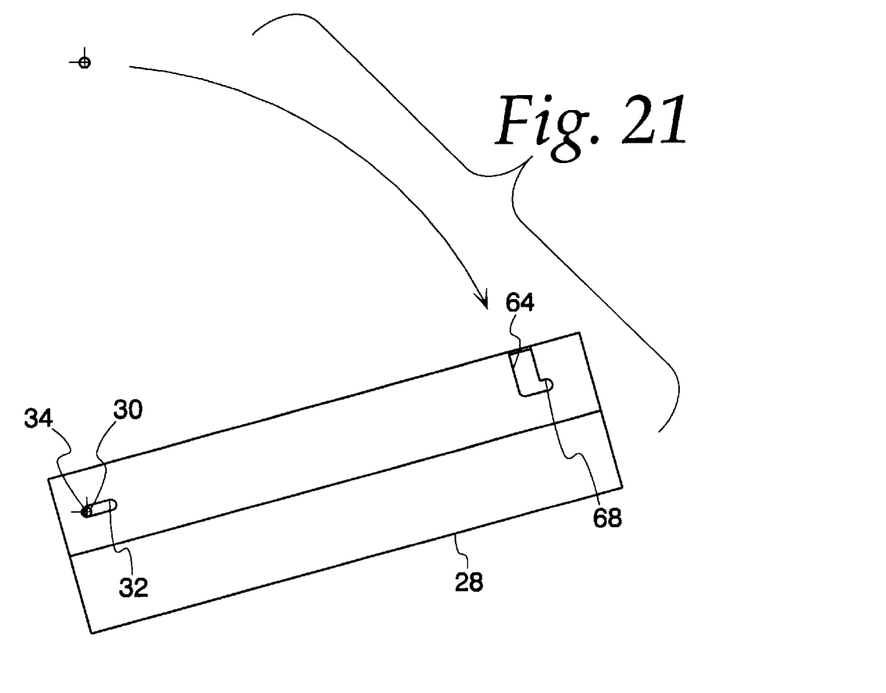
FIG. 21 is a view as in FIGS. 19 and 20 with the closure element in the open position therefor.

After the objects 16 are loaded with each closure element 28 in the open position, the closure element 28 can be pivoted back to the closed position. As the closure element 28 approaches the closed position, pins 62 (FIGS. 19, 20) move, one each, into an L-shaped slot 64 at each side edge of the closure element 28 to the state shown in FIG. 20. The closure element 28 is then released so that the closure element 28 shifts downwardly in the direction of the arrow 66 to the FIG. 19 position, causing the pins 30, 62 to move to the upper edge of the slots 32, 62, whereby attempted opening pivoting movement of the closure element 28 is arrested by slot edges 68 which abut to the pins 62. To effect opening, the closure elements 28 must first be shifted upwardly to a transition location, as shown in FIG. 20, and then pivoted outwardly. With the closure element 28 in the closed position, the closure element 28 substantially block the opening 26 and thereby access to the storage sub-space 22 from the loading location immediately forwardly of the loading opening 26.

A removal opening 70 in communication with each storage sub-space 22, is provided in each closure element 28, and potentially partially in the frame 12, and permits removal individually of the objects 16 from the storage position in the storage sub-space 22. The removal opening 60 preferably has a cross-sectional area that has the same general shape as one profile of the objects 16 being displayed and has a slightly larger dimension than that profile to allow the objects 16 to be grasped and drawn through the removal opening 70 by the user without significant interference.

Figure 4:
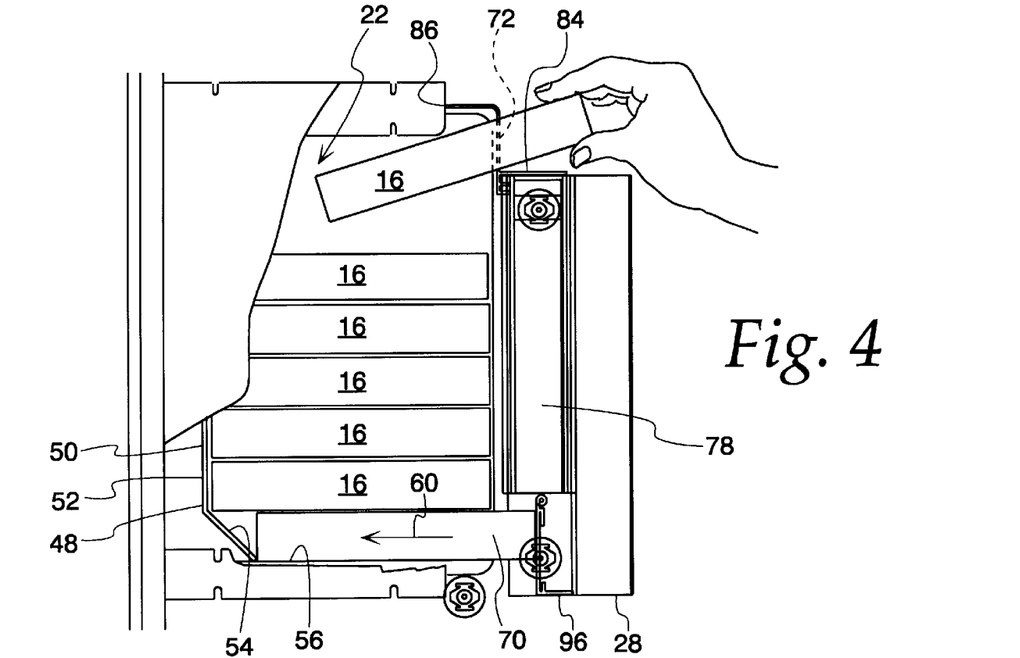
FIG. 4 is an enlarged, fragmentary, side elevation view of the display system in FIGS. 1–3 with an object being directed into the storage space.
Figure 5:
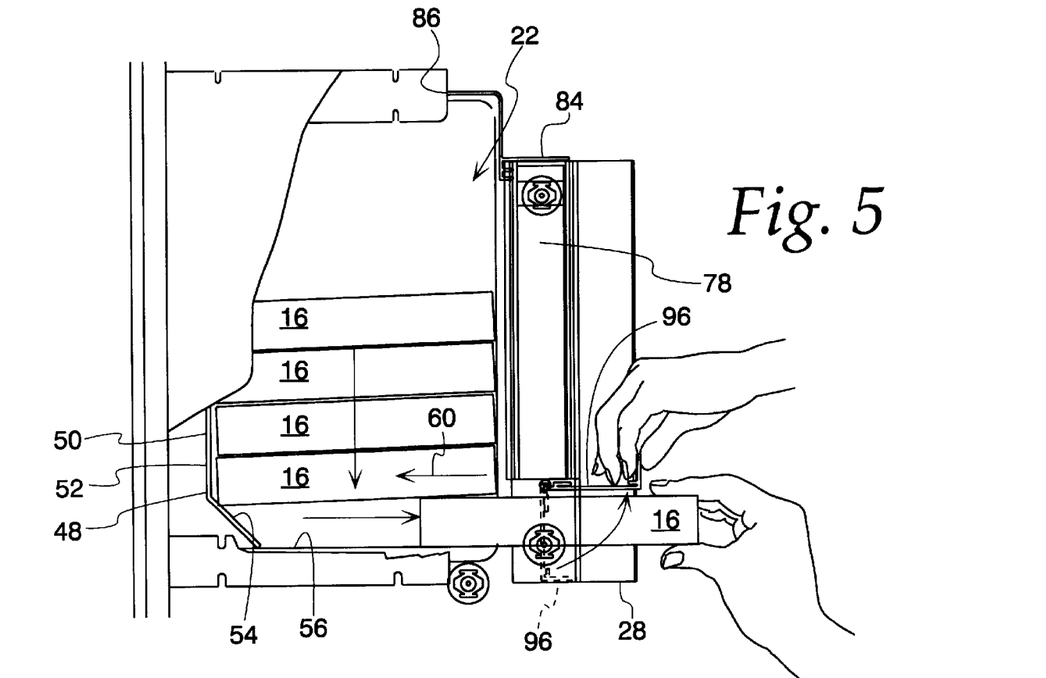
FIG. 5 is a view as in FIG. 4 with an object being removed from the storage space.
Figure 6:
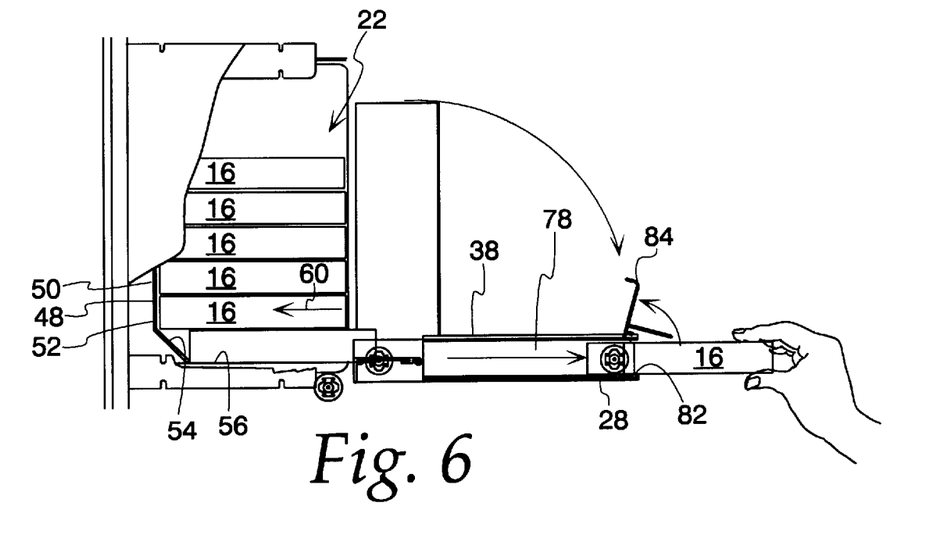
FIG. 6 is a view as in FIGS. 4 and 5 with the closure element being repositioned as in FIG. 3 and an object being directed into a receptacle in the closure element for display therewithin.

As seen clearly in FIGS. 4–6, stacked objects 16 in the display position are urged under their own weight downwardly within the storage sub-space 22. The bottommost object 16 abuts to the ramp surface 54 and is cammed transversely to a vertical direction i.e. forwardly, so as to be in close proximity to the removal opening 70. The user can then conveniently grasp the bottommost object 16, as shown in FIG. 5, and withdraw that object 16.

Figure 1:
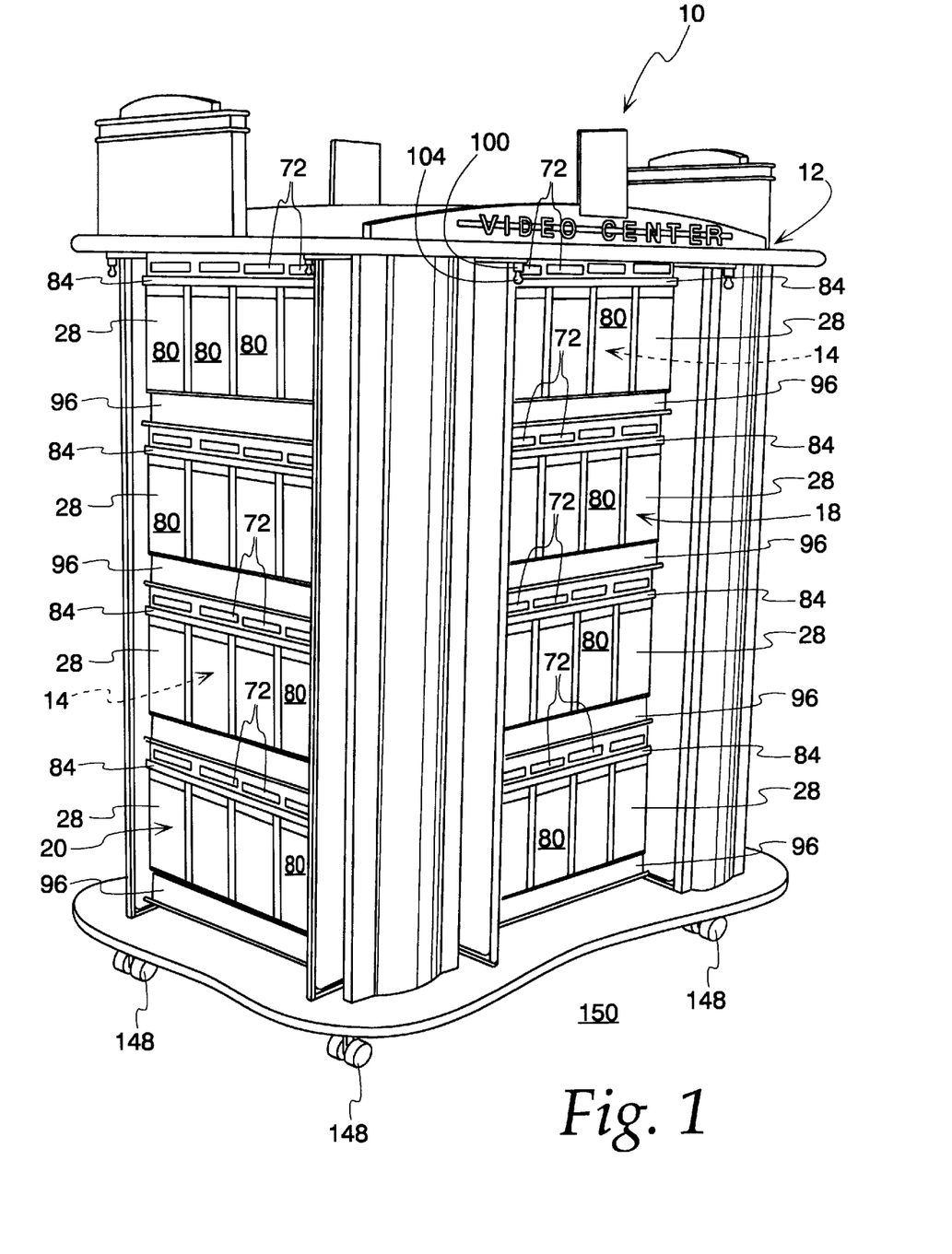
FIG. 1 is a perspective view of a display system, according to the present invention.
Figure 2:
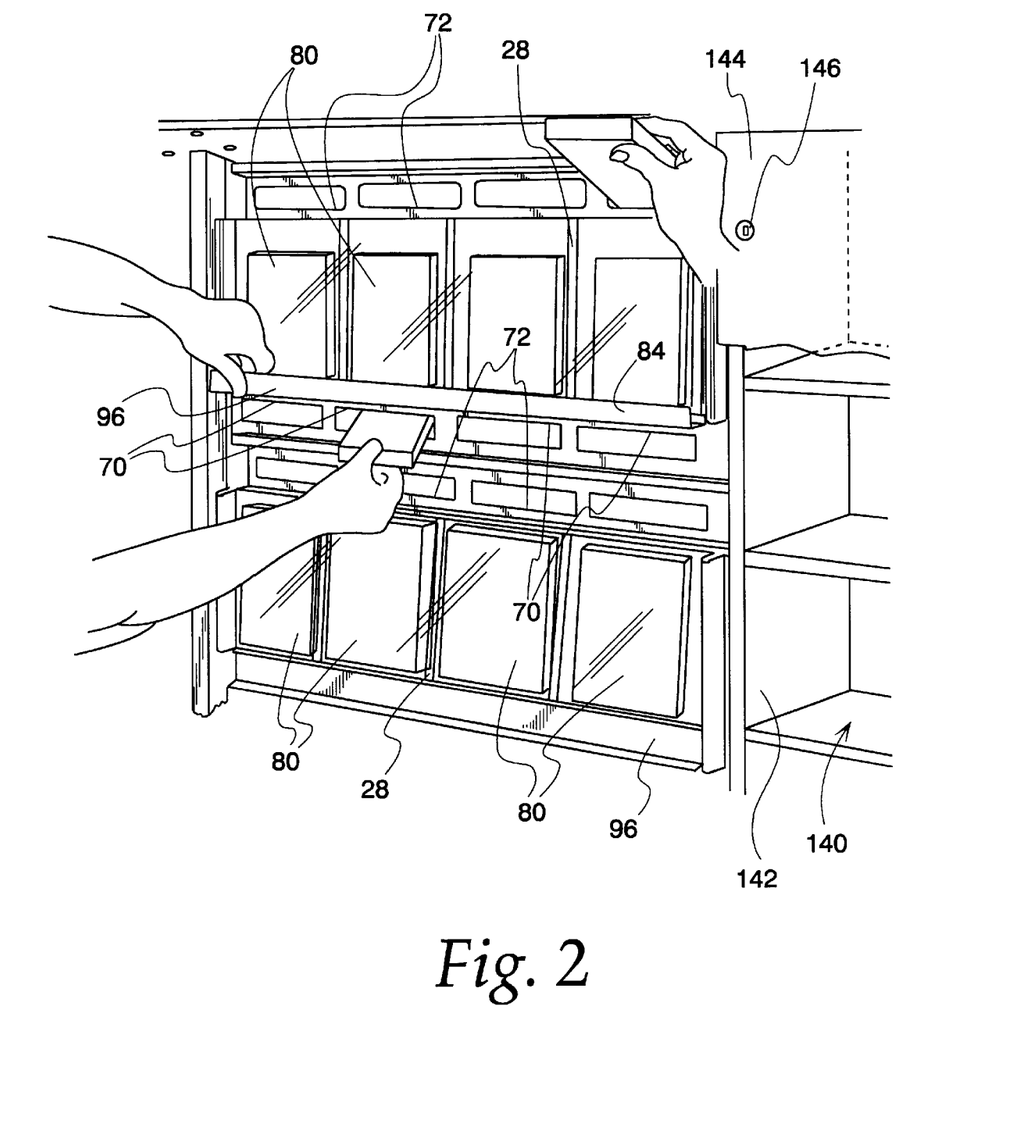
FIG. 2 is an enlarged, fragmentary, perspective view of the inventive display system showing one object being directed into, and one object being removed from, a storage space on a frame on the inventive display system.
Figure 3:
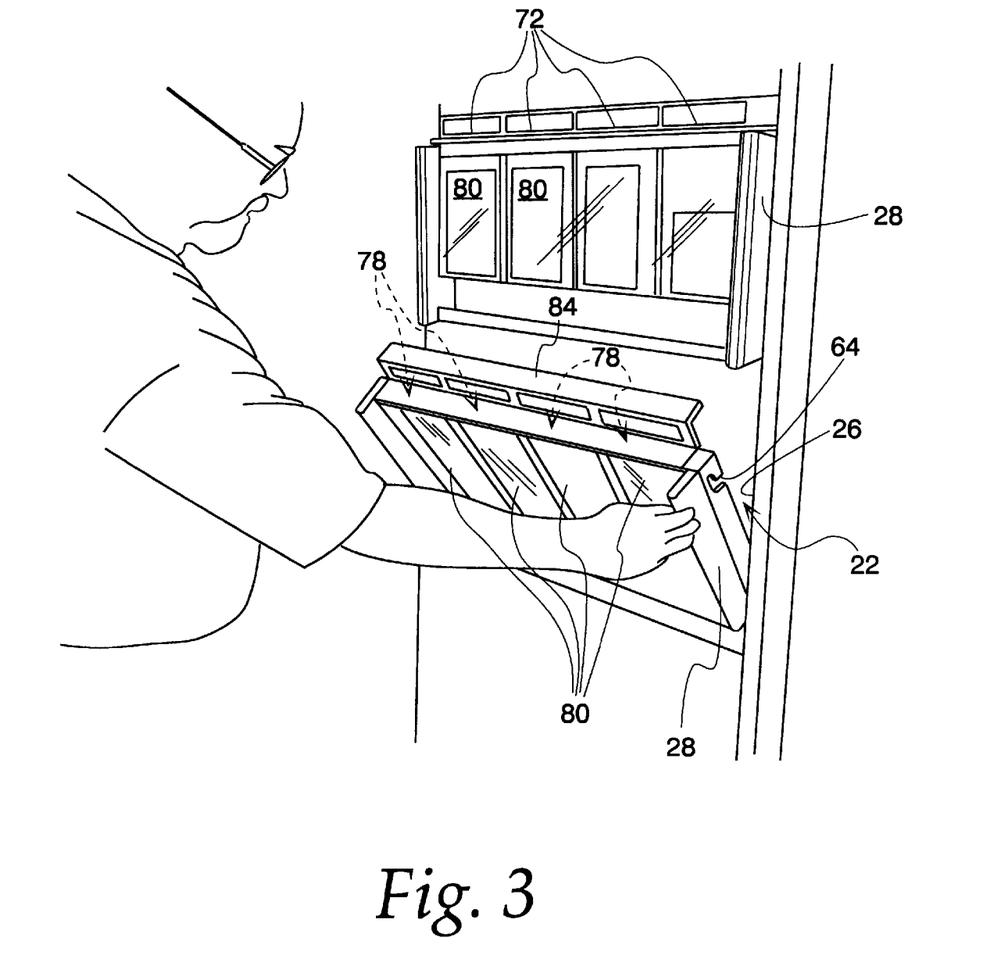
FIG. 3 is a view similar to that in FIG. 2 with a closure element in front of the storage space being resituated to facilitate bulk loading of objects into the storage space.

Each closure element 28 is also provided with loading openings 72 which are in communication with the storage sub-space 22 at the top thereof, above the removal openings 60. The loading openings 72, which could alternatively be provided on the frame 12, have the same general cross-sectional configuration as that of the removal openings 70. The loading openings 72 facilitate placement of the objects 16 in the storage position within the storage sub-space 22. As shown in FIGS. 2 and 4, the objects 16 can be directed, one-by-one, through the loading opening 72 into stacked relationship in the storage position within the storage sub-spaces 22. This gives the user the option of loading the objects 16 one-by-one into the storage sub-space 22 or opening the closure elements 28 to permit more unobstructed access to the storage sub-spaces 22 through the larger loading opening 26. At the same time, a user that removes the bottommost object 16 through the removal opening 70 and decides not to purchase or rent that object 16, may conveniently return the inspected object 16 to the storage sub-space 22 through the loading opening 72.

To facilitate identification of the contents of the compartments 40, 42, 44, 46, each closure element 28 is provided with a like number of receptacles 78 for a sample object 16 within the associated compartment 40, 42, 44, 46. Each closure element 28 may have a clear plastic or glass cover/window 80 thereover to permit viewing of the object 16 residing within the receptacle 78. The receptacles 78 are accessible through top openings 82 in the closure elements 28. Each closure element 28 has a door 84 at the top thereof that is pivotable between a blocking position, as shown in FIGS. 1–5, wherein the door 84 blocks the top openings 82 to prevent an object 16 from being directed into or removed from a receptacle 78 through the top opening 82, and an access position, as shown in FIGS. 6 and 8, wherein the top opening 82 are exposed to allow objects 16 to be directed into and removed from the receptacles 78 through the openings 82.

The loading openings 72 are formed in a part of the door 84, which pivots as the door 84 moves between the blocking and access positions. The door 84 can be pivoted from the blocking position to the access position therefor only with the closure element 28 in the open position. With the closure element 28 in the closed position, as seen in FIGS. 4 and 5, a back edge 86 on the door 84 abuts to the frame 12 to prevent pivoting movement of the door 72 out of the blocking position.

Figure 7:
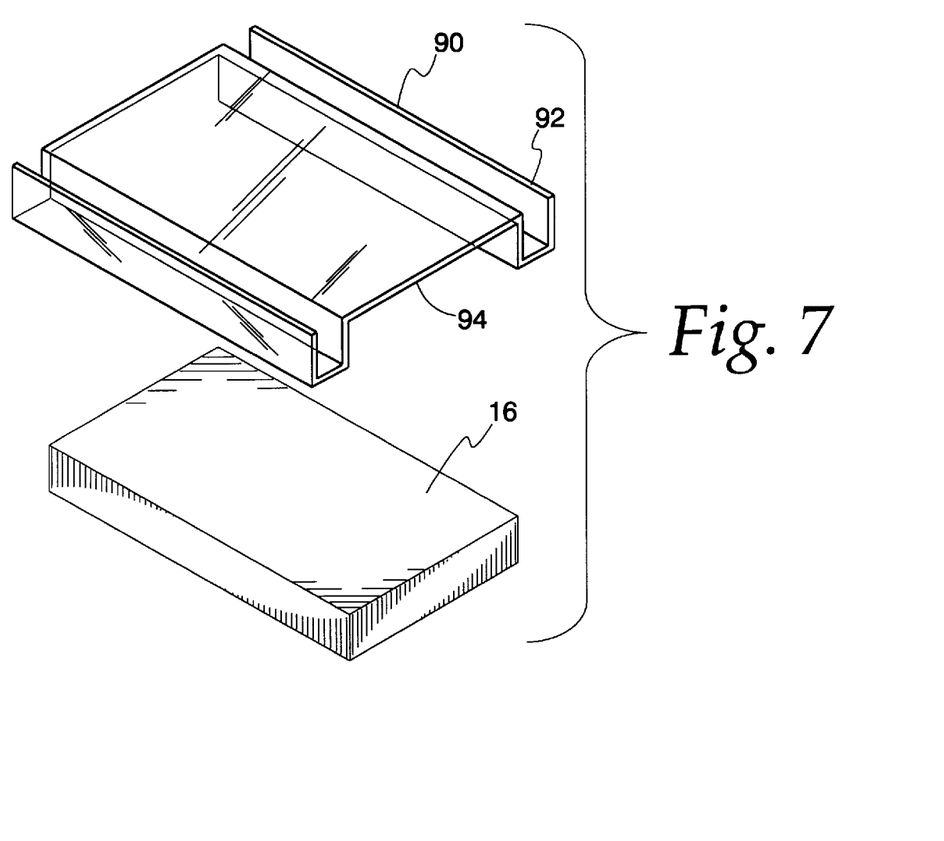
FIG. 7 is an enlarged, perspective view of an insert which is used to maintain an object in a predetermined position within the receptacle in the closure element.
Figure 8:
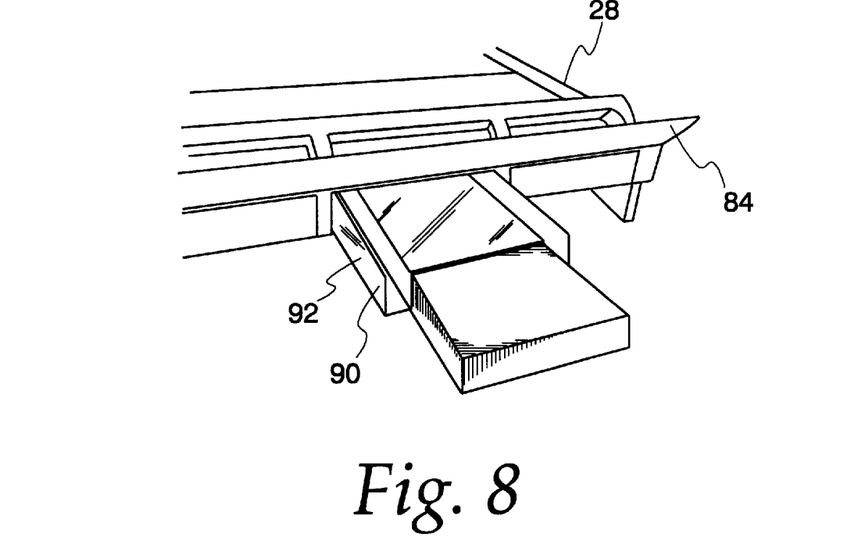
FIG. 8 is an enlarged, perspective view of the object and the insert in FIG. 7 being directed into the receptacle in the closure element.
Figure 9:
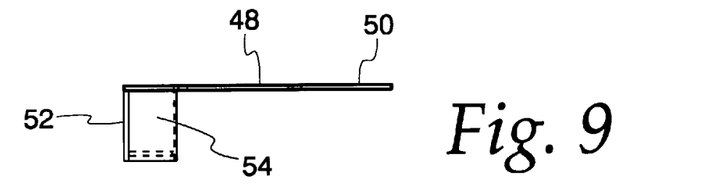
FIG. 9 is an enlarged, plan view of a divider that can be placed in the storage space to selectively divide the storage space into compartments.
Figures 10, 11:
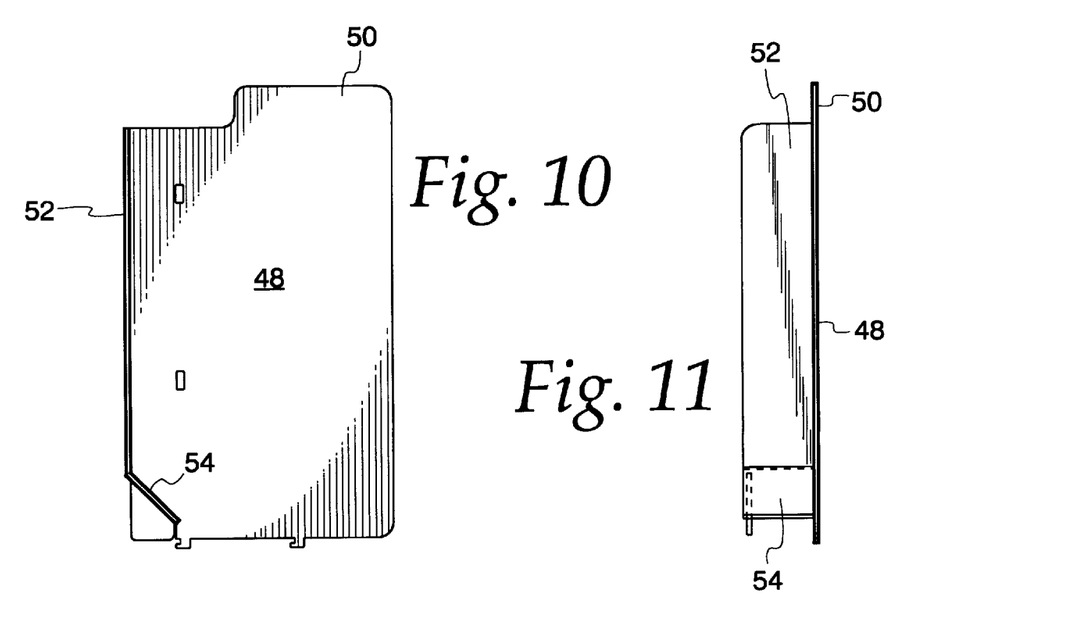
FIG. 10 is an enlarged, side elevation view of the divider in FIG. 9.
FIG. 11 is an enlarged, front elevation view of the divider in FIGS. 9 and 10.
Figure 12:
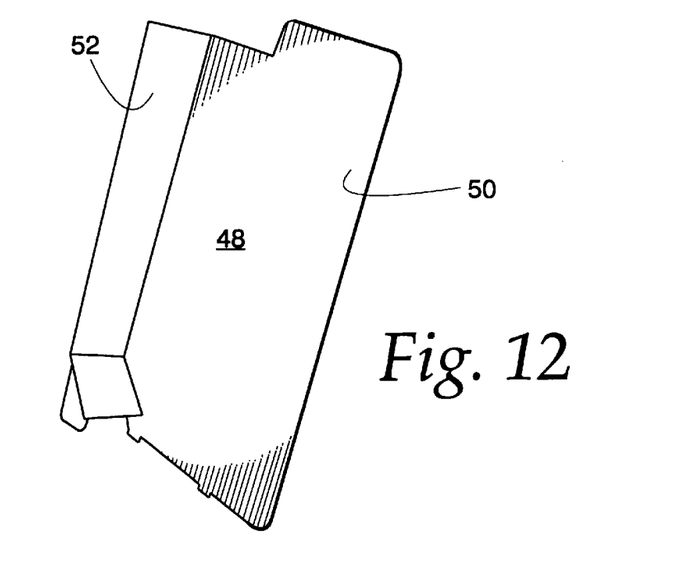
FIG. 12 is an enlarged, perspective view of the divider in FIGS. 9–11.

To accommodate objects 16 of different size, and to maintain the objects 16 centered within the receptacles 78, centering inserts, shown in FIGS. 7 and 8 at 90, can be employed. Each insert 90 has a frame 92 that fits snugly within a receptacle 78. The insert frame 92 defines a sub-receptacle 94 which can be closely matched to the configuration of the object 16 to be displayed.

To prevent unwanted access to objects 16 in the storage position within a storage sub-space 22, a door 96 is provided on each closure element 28. Each door 84 is pivotably mounted for movement between a blocking position, shown in FIGS. 1, 4, 15 and 16, and an access position, shown on the top closure element 28 in FIG. 2 and in FIG. 5. In the blocking position, the door 96 covers the removal openings 70. By grasping the door 96, as shown in FIG. 5, the door 96 can be pivoted from the blocking position to the access position, wherein the removal openings 70 are exposed, thereby permitting access to the bottommost objects 16 within the storage sub-space 22.

Figures 14, 15, 16:
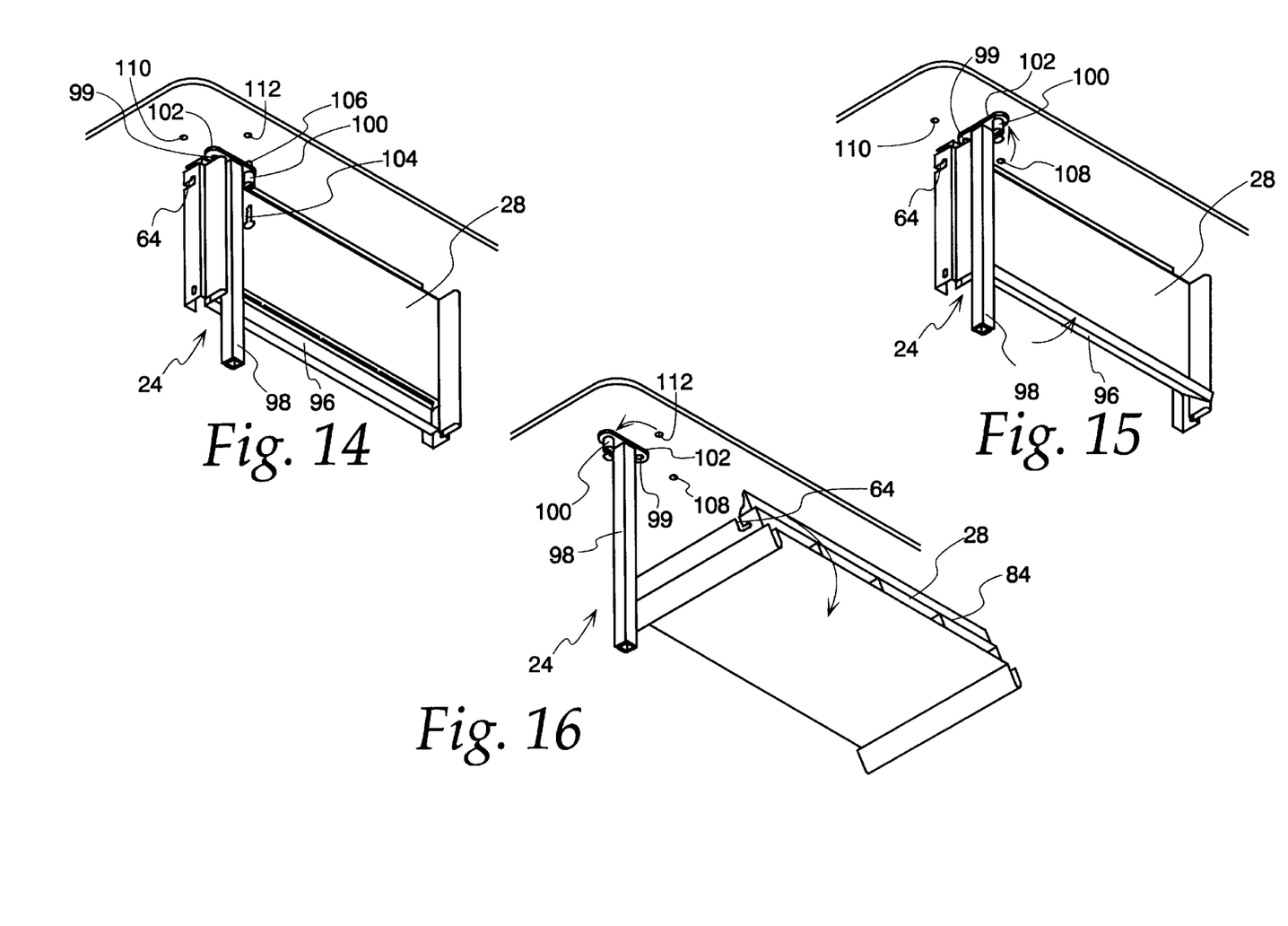
FIG. 14 is a fragmentary, perspective view of a locking system for the closure element and with the locking system in a locked state.
FIG. 15 is a view as in FIG. 14 with the locking system in a partially locked state in which a door on the closure element can be repositioned with the closure element itself being maintained in a closed position.
FIG. 16 is a view as in FIGS. 14 and 15 with the locking system in an unlocked state.

For security, a locking system 24 is activated. The locking system 24 includes at least one vertically extending bar 98, as seen in FIGS. 1 and 14–16. The bar 98 is pivotable around vertically spaced, offset pins 99 about a vertically extending axis defined by the pins 99 between a fully locked position, as shown in FIG. 14, and an unlocked position, as shown in FIG. 16. In the locked position, the bar 98 resides directly in front of, and closely adjacent to an edge on each of, the doors 96 to prevent the doors 96 from being pivoted out of the blocking position into the access position therefor. The closure element 28 itself is likewise prevented from pivoting from the closed position into the open position therefor. With the bar 98 in the unlocked position of FIG. 16, both the closure element 28 and door 96 can be freely repositioned to the open and access positions, respectively. In FIG. 15, the bar 98 is in a transition position between the locked and unlocked positions. With the bar 98 in the transition position, the door 96 can be moved between the blocking and access positions, however, the closure element 28 is blocked by the bar 98 in the closed position. This allows consumers to access the objects 16 one-by-one, but does not permit access to the storage sub-spaces 22 for bulk removal of objects 16. With the arrangement shown, a single bar 98 can lock the door 96 associated with each of the four closure elements 28 on each wall 18, 20.

A locking element 100 is mounted on a flange 102 on each bar 98 and is operable through a key 104 to extend a pin 106 (FIG. 15) into bores 108, 110, 112 with the bar 98 in the locked position, unlocked position, and transition position. With the key 104 removed, the bar 98 cannot be moved out of any of the three different positions in which it is set.

Figure 17:
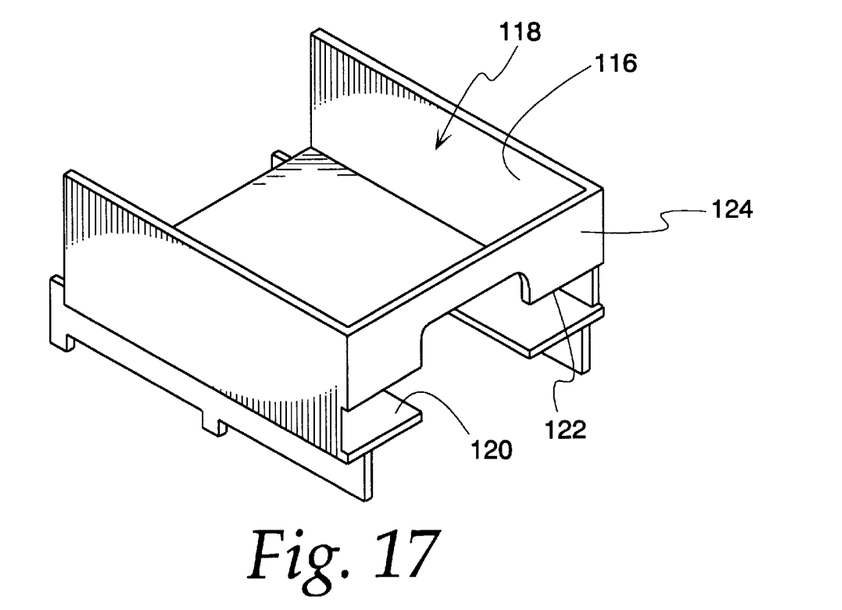
FIG. 17 is an enlarged, perspective view of a cassette which can be placed in the storage space to hold a plurality of discrete objects.
Figure 18:
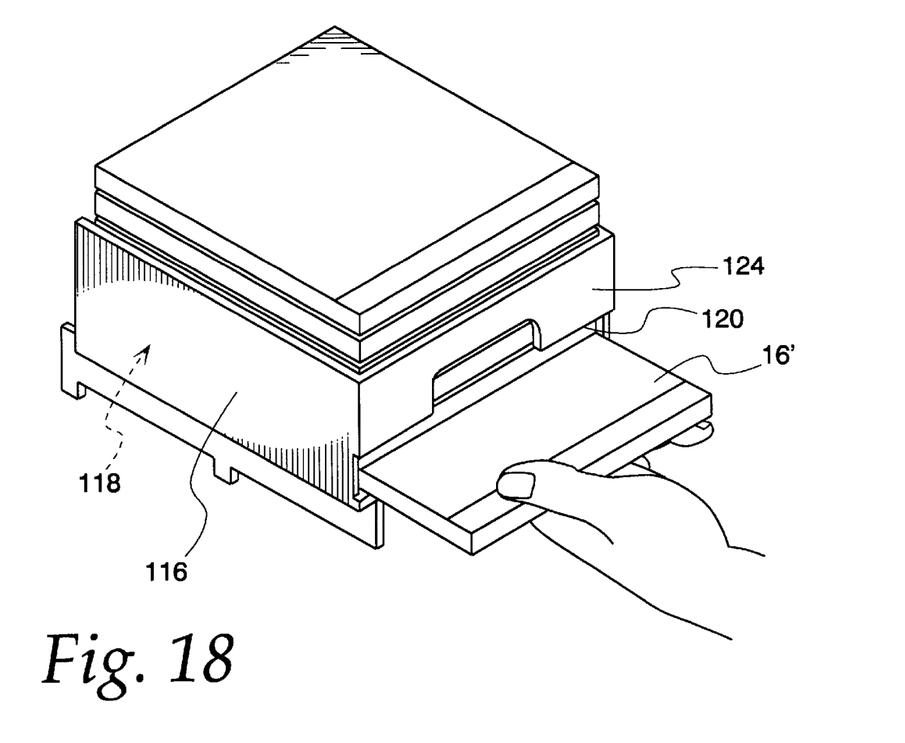
FIG. 18 is a view as in FIG. 17 with a plurality of discrete objects in a receptacle in the cassette.
Figure 22:
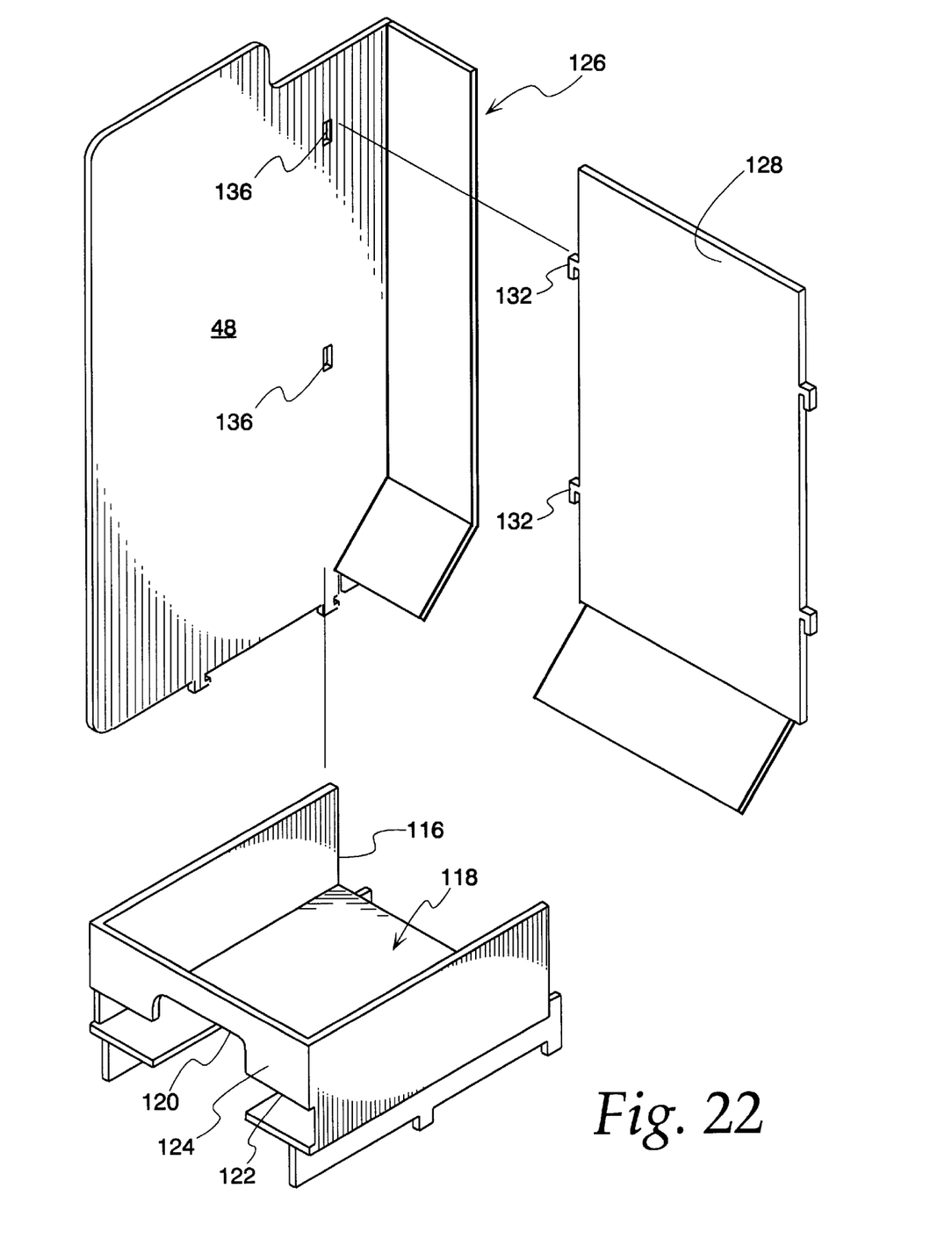
FIG. 22 is an enlarged, exploded, perspective view of the cassette in FIGS. 17 and 18 in relationship to a guide assembly for directly introducing objects into the cassette.

To facilitate storage of different size objects 16 within the storage sub-spaces 22, a cassette 116, as shown in FIGS. 17, 18, and 22, may be used. The cassette 116 defines a receptacle 118 for multiple objects 16'. The objects 16' are shown to have a smaller profile than the objects 16. In the absence of the use of the cassette 116, a user could grasp, and simultaneously remove, a number of the objects 16' through the removal openings 70. To prevent this from occurring, the cassette 116 is provided with a T-shaped exit opening 120 in communication with the receptacle 118 through which objects 16' can be withdrawn from the receptacle 118. The cross-sectional area of the bottom portion 122 of the exit opening 120 is matched to the profile of the object 16' and has an area that is less than the area of the removal openings 70. Thus, the wall portion 124 of the cassette 116 blocks removal of more than one object 16' stacked within the receptacle 118. The cassette 116 can be configured to closely fit within any one of the storage compartments 40, 42, 44, 46.

Direction of the objects 16' into the receptacle 118 is facilitated by the use of a guide assembly at 126 consisting of a divider 48, as previously described, and a complementary insert 128, which can be releasably attached through bars 132 to the divider 48, to increase the lateral dimension of the divider 48 and decrease the fore-and-aft dimension of a compartment otherwise defined within a storage sub-space 22 occupied by the divider 48. The ears 132 can be directed into complementary openings 136 in the divider 48 to facilitate assembly and disassembly of the divider 48 and insert 128. The divider 48 can thus be conveniently used selectively either alone or together with the insert 128.

Optionally, a frame extension 140 can be used to provide a lockable storage compartment 142 that is separate from the storage space 14. A door 144 may be hinged or otherwise guidingly movable with respect to the frame 12 between open and closed positions. In the open position, the storage compartment 142 can be accessed to place a bulk supply of objects 16, 16' to be displayed. A conventional lock 146 can be used to maintain the door 144 in the closed position.

To facilitate movement of the display system from one location to another, rolling elements/wheels 148 are provided on the frame 12 to be rolled against a subjacent surface 150 supporting the display system 10.

The foregoing disclosure of specific embodiments is intended to be illustrative of the broad concepts comprehended by the invention.

What is claimed is:

1. A display system comprising:
    a frame;
    a storage space on the frame for an object to be displayed;
    a closure element on the frame that is repositionable between a closed position and an open position,
    the closure element blocking access to the storage space from a loading location with the closure element in the closed position and permitting access to the storage space from the loading location with the closure element in the open position;
    a loading opening through at least one of the frame and closure element in communication with the storage space; and
    a removal opening through at least one of the frame and closure element that is spaced from the loading opening and in communication with the storage space,
    whereby an object to be displayed can be directed into the storage space selectively a) from the loading location with the closure element in the open position and b) through the loading opening with the closure element in the closed position into a storage position within the storage space and removed from the storage position through the removal opening,
    wherein there is a receptacle on the closure element for an object to be displayed, the receptacle moving with the closure element as the closure element moves between the open and closed positions.

2. The display system according to claim 1 further comprising at least one object that is at least one of a) an audio tape, b) a video tape, c) an audio disk, d) a video disk, and e) a disk with data stored thereon that is in the storage position in the storage space.

3. The display system according to claim 2 wherein there are a plurality of objects in stacked relationship each in the storage position in the storage space.

4. The display system according to claim 1 wherein the loading opening is above the removal opening so that objects directed into the storage space through the loading opening are urged under their own weight downwardly towards the removal opening.

5. The display system according to claim 1 further comprising a door on the closure element that is repositionable relative to the closure element between a blocking position and an access position, the door in the blocking position preventing removal of an object from the storage space through the removal opening.

6. The display system according to claim 5 further comprising a locking system on the frame for selectively maintaining the door in the blocking position.

7. The display system according to claim 6 wherein the locking system comprises a bar that is pivotable about a substantially vertically extending axis relative to the frame between a locked and unlocked position, the bar in the locked position abutting to the door to prevent the door from moving from the blocking position into the access position.

8. The display system according to claim 1 wherein there is a window on the closure element to allow viewing of an object in the receptacle on the closure element with the closure element in the closed position.

9. The display system according to claim 8 further comprising a second loading opening in communication with the receptacle in the closure element, a door on the closure element that is repositionable between a) a blocking position wherein the door prevents the direction of an object to be displayed through the second loading opening into the receptacle on the closure element and b) an access position wherein an object to be displayed can be directed through the second loading opening into the receptacle on the closure element.

10. The display system according to claim 1 further comprising a divider that is positionable selectively in a plurality of different positions within the storage space to thereby selectively define different compartment configurations within the storage space.

11. The display system according to claim 4 further comprising a cam surface within the storage space for guiding an object directed into the storage space through the loading opening in a direction transverse to vertical as an object moves under its own weight towards the removal opening.

12. The display system according to claim 1 further comprising a cassette within the storage space and defining a receptacle for an object to be displayed, there being an exit opening on the cassette in communication with the receptacle, the removal opening has a first area, the exit opening has a second area, and the first and second areas are different.

13. The display system according to claim 12 further comprising a plurality of objects to be displayed within the cassette receptacle.

14. The display system according to claim 12 wherein the second area is smaller than the first area.

15. The display system according to claim 1 further comprising at least one rolling element on the frame for facilitating movement of the frame against and relative to a subjacent surface supporting the display system.

16. The display system according to claim 1 wherein there are a plurality of storage sub-spaces in the storage space on the frame and a plurality of closure elements on the frame that are each associated with a storage sub-space and repositionable selectively between a) a closed position wherein each closure element blocks access to its associated storage sub-space from an associated loading location and b) an open position wherein access to the storage sub-space associated with each closure element is permitted from the associated loading location.

17. The display system according to claim 16 wherein a first closure element in the plurality of closure elements is spaced vertically from a second closure element in the plurality of closure elements.

18. The display system according to claim 16 wherein the frame has first and second transverse walls and a first closure in the plurality of closure elements is provided on the first wall and a second closure element in the plurality of closure elements is provided on the second wall.

19. The display system according to claim 1 wherein the loading opening is formed through the closure element.

20. The display system according to claim 1 wherein the removal opening is formed through the closure element.

21. A display system comprising:

a frame;

a storage space on the frame for an object to be displayed;

a closure element on the frame that is repositionable between a closed position and an open position, the closure element blocking access to the storage space from a loading location with the closure element in the closed position and permitting access to the storage space from the loading location with the closure element in the open position;

a loading opening through at least one of the frame and closure element in communication with the storage space; and a removal opening through at least one of the frame and closure element that is spaced from the loading opening and in communication with the storage space, whereby an object to be displayed can be directed into the storage space selectively a) from the loading location with the closure element in the open position and b) through the loading opening with the closure element in the closed position into a storage position within the storage space and removed from the storage position through the removal opening, wherein there is a storage compartment on the frame and separated from the storage space for storing a supply of objects to be placed in the storage space.

22. The display system according to claim 21 there is a lockable door on the frame to selectively prevent access to the storage compartment.

23. A display system comprising:

a frame;

a storage space on the frame for an object to be displayed;

a closure element on the frame that is repositionable between a closed position and an open position, the closure element blocking access to the storage space from a loading location with the closure element in the closed position and permitting access to the storage space from the loading location with the closure element in the open position;

a loading opening through at least one of the frame and closure element in communication with the storage space;

a removal opening through at least one of the frame and closure element that is spaced from the loading opening and in communication with the storage space; and a door on the closure element that is mounted to the closure element for movement relative to the closure element between first and second positions, whereby an object to be displayed can be directed into the storage space selectively a) from the loading location with the closure element in the open position and b) through the loading opening with the closure element in the closed position into a storage position within the storage space and removed from the storage position through the removal opening.

24. The display system according to claim 23 wherein the removal opening is formed through the closure element, the door in the first position is in a blocking position, the door in the second position is in an access position, with the door in the blocking position the door prevents removal of an object from the storage space through the removal opening and with the door in the access position an object can be removed from the storage space through the removal opening.

25. The display system according to claim 23 wherein there is a receptacle on the closure element and a second loading opening in communication with the receptacle in the closure element, the door in the first position is in a blocking position, the door in the second position is in an access position, with the door in the blocking position the door blocks direction of an object through the second loading opening into the receptacle on the closure element, and with the door in the access position an object can be directed through the second loading opening into the receptacle on the closure element.

26. A display system comprising:

a frame;

a storage space on the frame for an object to be displayed;

a closure element on the frame that is repositionable between a closed position and an open position, the closure element blocking access to the storage space from a loading location with the closure element in the closed position and permitting access to the storage space from the loading location with the closure element in the open position;

a loading opening through at least one of the frame and closure element in communication with the storage space; and a removal opening through at least one of the frame and closure element that is spaced from the loading opening and in communication with the storage space, whereby an object to be displayed can be directed into the storage space selectively a) from the loading location with the closure element in the open position and b) through the loading opening with the closure element in the closed position into a storage position within the storage space and removed from the storage position through the removal opening, wherein there is a receptacle on the closure element for an object, the receptacle moving with the closure element as the closure element moves between the open and closed positions.

* * * * *